US009277298B2

United States Patent
Yang et al.

(10) Patent No.: US 9,277,298 B2
(45) Date of Patent: Mar. 1, 2016

(54) BATTERY MANAGING APPARATUS, BATTERY PACK, AND ENERGY STORAGE SYSTEM

(75) Inventors: Jong-Woon Yang, Yongin-si (KR);
Tetsuya Okada, Yongin-si (KR);
Eui-Jeong Hwang, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 731 days.

(21) Appl. No.: 13/562,523

(22) Filed: Jul. 31, 2012

(65) Prior Publication Data

US 2013/0069429 A1 Mar. 21, 2013

Related U.S. Application Data

(60) Provisional application No. 61/536,791, filed on Sep. 20, 2011.

(51) Int. Cl.
*H04Q 9/00* (2006.01)

(52) U.S. Cl.
CPC ........... *H04Q 9/00* (2013.01); *H04Q 2209/886* (2013.01); *Y10T 307/344* (2015.04); *Y10T 307/352* (2015.04); *Y10T 307/696* (2015.04)

(58) Field of Classification Search
CPC .................. H02J 9/00; H02J 1/00; H02J 3/00
USPC .......................................... 307/82, 23, 24, 80
See application file for complete search history.

(56) References Cited

U.S. PATENT DOCUMENTS

| 6,208,039 | B1 | 3/2001 | Mendelsohn et al. |
| 7,567,085 | B2 | 7/2009 | Kim et al. |
| 2008/0232005 | A1* | 9/2008 | Kuehnle et al. ................. 361/21 |
| 2011/0140649 | A1 | 6/2011 | Choi |
| 2011/0161024 | A1 | 6/2011 | Sim et al. |

(Continued)

FOREIGN PATENT DOCUMENTS

| JP | 2005-328603 | 11/2005 |
| JP | 2008-125199 | 5/2008 |
| KR | 10-2003-0062014 | 7/2003 |

(Continued)

OTHER PUBLICATIONS

Korean Notice of Allowance issued on Mar. 28, 2014 in connection with Korean Patent Application No. 10-2012-0088955 which also claims U.S. Appl. No. 61/536,791 as its priority document, and Request for Entry of the Accompanying Office Action attached herewith.

(Continued)

*Primary Examiner* — Jared Fureman
*Assistant Examiner* — Rafael Pacheco
(74) *Attorney, Agent, or Firm* — Robert E. Bushnell, Esq.

(57) ABSTRACT

An energy storage system having a number of trays with each tray having a number of battery cells in which power is controllably stored and discharged. A first Battery Management System (BMS) is electrically coupled to a tray contained in a rack of trays. A second BMS is electrically coupled to and controls the first BMS. The first BMS includes a control unit electrically coupled to and controlling the battery cells. It further includes a switch unit electrically coupled to the control unit and selectively applying driving power according to a control signal from the second BMS.

15 Claims, 6 Drawing Sheets

(56) References Cited

U.S. PATENT DOCUMENTS

2012/0032638 A1     2/2012   Jung
2012/0091965 A1*   4/2012   Seo et al. .................... 320/128

FOREIGN PATENT DOCUMENTS

KR           101000550 B1    12/2010
KR     1020110074207 A     6/2011

OTHER PUBLICATIONS

Chinese Office Action issued by the Chinese Patent Office on Jul. 1, 2015 in the examination of the Chinese Patent Application No. 201210352280.3, which corresponds to the present application. English translation is provided.

* cited by examiner

BATTERY MANAGING APPARATUS, BATTERY PACK, AND ENERGY STORAGE SYSTEM

CLAIM OF PRIORITY

This application claims priority to and the benefit of Provisional Application No. 61/536,791, filed on 20 Sep. 2011, in the United States Patent and Trademark Office, the entire content of which is incorporated herein by reference.

BACKGROUND OF THE INVENTION

1. Field of the Invention

The present invention generally relates to a battery managing apparatus, a battery pack using the battery managing apparatus, and an energy storage system using the battery pack.

2. Description of the Related Art

Due to problems of environment destruction, resource exhaustion, and the like, there is increasing demand for a system capable of efficiently using stored power. Also, there is increasing demand for renewable energy that does not cause pollution during power generation. An energy storage system is a system that connects renewable energy, a power storing battery, and existing power from a grid, and much research has been conducted to conform to environmental changes.

The above information disclosed in this Related Art section is only for enhancement of understanding of the background of the invention and therefore it may contain information that does not form the prior art that is already known to a person of ordinary skill in the art.

SUMMARY OF THE INVENTION

The present invention has been made in an effort to provide a battery managing apparatus, a battery pack using the battery managing apparatus, and an energy storage system using the battery pack.

An exemplary embodiment of the present invention provides for an energy storage system, having a plurality of trays with each tray having a plurality of battery cells; a first BMS (Battery Management System) electrically coupled to a tray of the plurality of trays; a rack comprising the plurality of the trays; and a second BMS (Battery Management System) electrically coupled to and controlling the first BMS. The first BMS, further comprises: a control unit electrically coupled to and controlling the plurality of battery cells; and a switch unit electrically coupled to the control unit and selectively applying a driving power according to a control signal from the second BMS.

The energy storage system also includes: a first converter converting the driving power and outputting a first converting signal; a second converter converting a battery power and outputting a second converting signal; and an AND gate electrically coupled to the first converter and the second converter. The AND gate sends the driving signal to the control unit when both the first converting signal and the second converting signal are more than a predetermined signal level.

The first BMS of the energy storage system further includes: a plurality of first BMSs; a synchronization signal delivering unit connected to a neighboring first BMS of the plurality of first BMSs to deliver a synchronization signal, wherein the synchronization signal is transmitted from the second BMS to one of the plurality of first BMSs, and transmitted from said one of the first BMSs of the plurality of first BMSs to another first BMS of the plurality of first BMSs in a cascade manner; a tray ON/OFF unit connected to the synchronization signal delivering unit; a first DC/DC converter connected to the tray ON/OFF unit; a second DC/DC converter connected to an analog front end (AFE); a microcontroller (MCU) ON/OFF unit connected to the first and second DC/DC converter; a third DC/DC converter connected to the microcontroller (MCU) ON/OFF unit; a MCU connected to the synchronization signal delivering unit and the third DC/DC converter; and a communication driving unit connected to the MCU and the rack BMS.

The energy storage system further includes: an AND gate electrically coupled to the first DC/DC converter and the second DC/DC converter, wherein the AND gate sends the driving signal to the control unit when both a first converting signal from the first DC/DC converter and a second converting signal from the second DC/DC converter are more than a predetermined signal level.

In the energy storage system, the plurality of battery cells receive power from a power generating system or supply power to a grid or supply power to a load.

The energy storage system also includes: a power conversion system connected to the plurality of battery cells and the power generating system to convert power from the power generating system, the grid or the plurality of battery cells and supply the power to the load; a first switch connected to the power conversion system and connected to the load; and a second switch serially connected to the first switch and connected to the power conversion system, the grid and the load. The first switch is turned on when power from the power generating system and/or the plurality of battery cells is supplied to the load, or when power from the grid is supplied to the battery pack. The second switch is turn on when power from the power generating system and/or the plurality of battery cells is supplied to the grid, or when power from the grid is supplied to the load and/or the plurality of battery cells. The second switch is turned off and the first switch is turned on when a power failure occurs in the grid.

In the energy storage system when the synchronization signal is set to a first level, the tray ON/OFF unit delivers driving power the first DC/DC converter, and when the synchronization signal is set to a second level that is different from the first level, the tray ON/OFF unit does not deliver the driving power to the first DC/DC converter.

The rack BMS determines whether the first tray BMS through the $n_{th}$ tray BMS operate based whether the tray ON/OFF unit delivers the driving power.

The first DC/DC converter receives the driving power delivered via the tray ON/OFF unit and adjusts a voltage level of the driving power and inputs the driving power to the MCU ON/OFF unit.

The analog front end (AFE) monitors voltage, current, temperature, remaining amount of power, and charge status of the first battery tray through an $n_{th}$ battery trays transmitting monitoring data to the MCU.

The AFE delivers a current output from the first battery tray through an $n_{th}$ battery tray to the second DC/DC converter, upon receipt of the current output the second DC/DC converter outputs the current to the MCU.

In the Energy Storage System when the MCU ON/OFF unit receives power from both the first DC/DC converter and the second DC/DC converter does the MCU ON/OFF unit input power received from first DC/DC converter or the second DC/DC converter to the third DC/DC converter.

Another exemplary embodiment of the present invention details a battery system, comprising: a battery rack to store power from at least one of a plurality of power generating units and a grid, the battery rack comprising: a first battery tray through an $n_{th}$ battery tray connected in series or in parallel; and a first BMS (Battery Management System) comprising a first tray BMS (Battery Management System) through an $n_{th}$ tray BMS (Battery Management System) connected to and corresponding to the first battery tray through the $n_{th}$ battery tray, respectively; and a second battery management system (BMS) to control an operation of the battery rack by monitoring data of the battery rack and transmitting a power control signal, wherein the first BMS is triggered in response to a power control signal (PCS) from the second BMS.

The battery system also includes: a first converter converting the driving power and outputting a first converting signal; a second converter converting a battery power and outputting a second converting signal; and an AND gate electrically coupled to the first converter and the second converter. The AND gate sends the driving signal to the control unit when both the first converting signal and the second converting signal are more than a predetermined signal level.

The first BMS also includes a plurality of first BMSs; a synchronization signal delivering unit connected to a neighboring first BMS of the plurality of first BMSs to deliver a synchronization signal, wherein the synchronization signal is transmitted from the second BMS to one of the plurality of first BMSs, and transmitted from said one of the first BMSs of the plurality of first BMSs to another first BMS of the plurality of first BMSs in a cascade manner; a tray ON/OFF unit connected to the synchronization signal delivering unit; a first DC/DC converter connected to the tray ON/OFF unit; a second DC/DC converter connected to an analog front end (AFE); a microcontroller (MCU) ON/OFF unit connected to the first and second DC/DC converter; a third DC/DC converter connected to the microcontroller (MCU) ON/OFF unit; a MCU connected to the synchronization signal delivering unit and the third DC/DC converter; and a communication driving unit connected to the MCU and the rack BMS.

In a power saving mode, the first tray BMS through the $n_{th}$ tray BMS are deactivated in response to the PCS that is applied to the rack BMS reducing power consumption.

Another aspect of the present invention is that only the first tray BMS through the $n_{th}$ tray BMS are deactivated while the rack BMS remains activated reducing power consumption while a basic function of the battery pack is maintained.

Another embodiment of the present invention entails a battery system electrically connectable to a power conversion system. The battery system includes: a battery rack to store power from at least one of the power generating unit and the grid, the battery rack comprising: a first battery tray through an $n_{th}$ battery tray connected in series or in parallel; and first BMSs comprising a first tray BMS through an $n_{th}$ tray BMS that connected to and correspond to the first battery tray through the $n_{th}$ battery tray, respectively; and a second battery management system (BMS) connectable to the power conversion system to control an operation of the battery rack by monitoring data of the battery rack and transmitting a power control signal, wherein the first BMSs are triggered in response to a power control signal (PCS) from the second BMS.

A power conversion system is connected to the battery rack and the power generating system to convert power from the power generating system, the grid or the battery rack and supply the power to the load; a first switch connected to the power conversion system and connected to the load; and a second switch serially connected to the first switch and connected to the power conversion system, the grid and the load.

The first switch is turned on when power from the power generating system and/or the plurality of battery cells is supplied to the load, or when power from the grid is supplied to the battery pack. The second switch is turn on when power from the power generating system and/or the plurality of battery cells is supplied to the grid, or when power from the grid is supplied to the load and/or the plurality of battery cells. The second switch is turned off and the first switch is turned on when a power failure occurs in the grid.

The battery system also includes a first converter converting the driving power and outputting a first converting signal; a second converter converting a battery power and outputting a second converting signal; and an AND gate electrically coupled to the first converter and the second converter. The AND gate sends the driving signal to the control unit when both the first converting signal and the second converting signal are more than a predetermined signal level.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
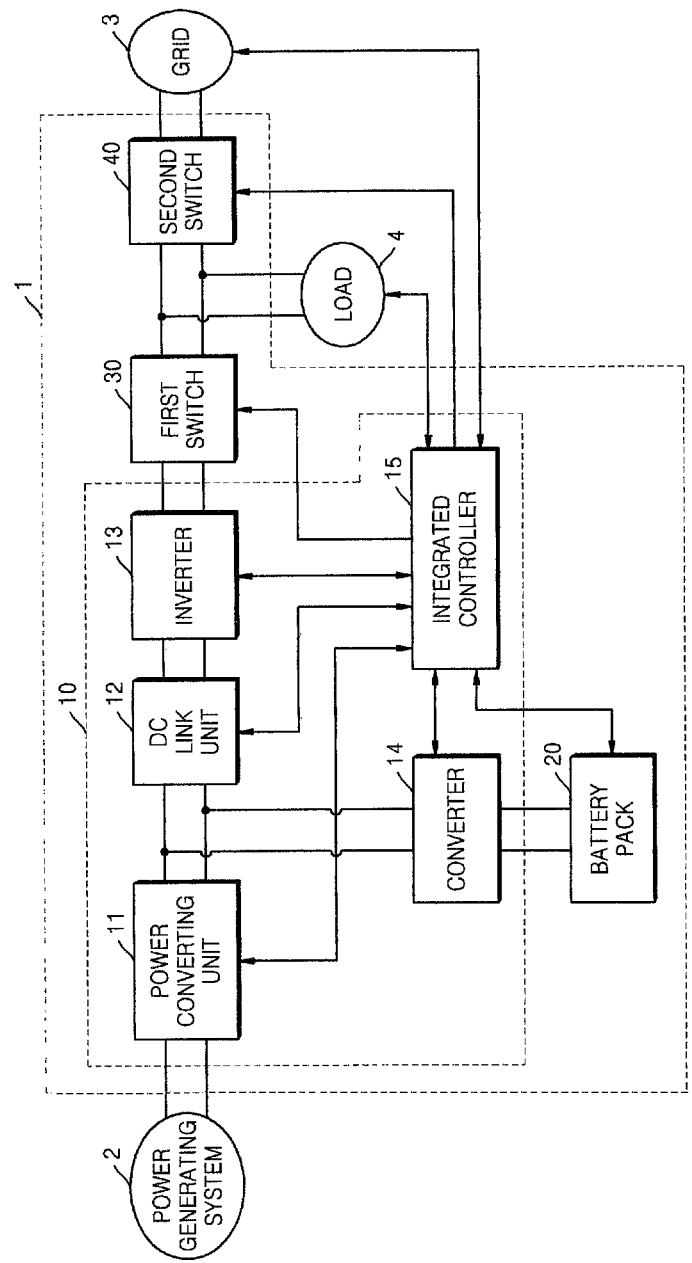
FIG. 1 is a diagram illustrating a configuration of an energy storage system according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Meanwhile, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof. While terms "first" and "second" are used to describe various components, it is obvious that the components are not limited to the terms "first" and "second". The terms "first" and "second" are used only to distinguish between each component.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

FIG. 1 is a diagram illustrating a configuration of an energy storage system 1 according to an embodiment of the present invention.

Referring to FIG. 1, the energy storage system 1 according to the present embodiment supplies power to a load 4, in conjunction with a power generating system 2 and a grid 3.

The power generating system 2 is a system for generating power by using an energy source, and supplies the generated power to the energy storage system 1. The power generating system 2 may be a solar power generating system, a wind power generating system, a tidal power generating system, or the like. However, examples of the power generating system 2 are not limited thereto and thus, the power generating system 2 may include power generating systems for generating power by using a renewable energy including solar heat, terrestrial heat, or the like. For example, a solar cell that generates electric energy by using a solar ray is easily installed in a house or a factory and thus the solar cell may be applied to the energy storage system 1, which may be distributed in each of houses. The power generating system 2 includes a plurality of power generating modules arranged in parallel with each other, and generates power via each of the power generating modules, so that the power generating system 2 may be a large capacity energy system.

The grid 3 includes a power generating station, a substation, a power transmission line, and the like. When the grid 3 is in a normal status, the grid 3 supplies power to the energy storage system 1 so as to allow the power to be supplied to the load 4 and/or a battery pack 20, and receives power from the energy storage system 1. When the grid is in an abnormal status, a power supply from the grid 3 to the energy storage system 1 is stopped, and a power supply from the energy storage system 1 to the grid 3 is also stopped.

The load 4 consumes power generated by the power generating system 2, power stored in the battery pack 20, or power supplied from the grid 3. Examples of the load 4 include a house, a factory, or the like.

The energy storage system 1 may store power generated by the power generating system 2 in the battery pack 20, or may supply the power to the grid 3. Also, the energy storage system 1 may supply power stored in the battery pack 20 to the grid 3, or may store power supplied from the grid 3 in the battery pack 20. In addition, when the grid 3 is in an abnormal status, e.g., when a power failure occurs in the grid 3, the energy storage system 1 may perform an Uninterruptible Power Supply (UPS) operation and then supply power to the load 4. When the grid 3 is in a normal status, the energy storage system 1 may supply power generated by the power generating system 2 or the power stored in the battery pack 20 to the load 4.

The energy storage system 1 may include a power conversion system 10 for controlling power conversion, the battery pack 20, a first switch 30, and a second switch 40.

The power conversion system 10 converts power from the power generating system 2, the grid 3, and the battery pack 20 according to required specification, and then supplies the power to desired components. The power conversion system 10 may include a power converting unit 11, a direct current (DC) link unit 12, an inverter 13, a converter 14, and an integrated controller 15.

The power converting unit 11 is a power converting device that is connected between the power generating system 2 and the DC link unit 12. The power converting unit 11 may convert a voltage output from the power generating system 2 into a DC link voltage, and delivers power generated by the power generating system 2 to the DC link unit 12.

According to the power generating system 2, the power converting unit 11 may be formed as a power converting circuit that may include a converter, a rectifier circuit, or the like. In a case where the power generating system 2 generates DC power, the power converting unit 11 may function as a DC/DC converter. In a case where the power generating system 2 generates alternating current (AC) power, the power converting unit 11 may function as a rectifier circuit for converting AC power into DC power. In particular, when the power generating system 2 is a solar power generating system, the power converting unit 11 may include a maximum power point tracking (MPPT) converter for performing MPPT control so as to maximally obtain power generated by the power generating system 2 according to a change in solar radiation intensity, temperature, and the like. When the power generating system 2 does not generate power, the power converting unit 11 may stop its operation so as to reduce power consumed by a converter, or the like.

A level of the DC link voltage may be unstable due to an instant voltage drop in the power generating system 2 or the grid 3 or a peak load occurrence in the load 4. However, it may be necessary to stabilize the level of the DC link voltage for a normal operation of the converter 14 and the inverter 13. The DC link unit 12 may be connected between the power converting unit 11 and the inverter 13, thereby constantly maintaining the level of the DC link voltage. For example, a large-capacity capacitor may be used as the DC link unit 12.

The inverter 13 is a power converting device connected between the DC link unit 12 and the first switch 30. The inverter 13 may include an inverter that converts the DC link voltage output from the power generating system 2 and/or the battery pack 20 into an AC voltage appropriate for the grid 3, and then output the AC voltage. Also, in order to store power from the grid 3 in the battery pack 20, the inverter 13 may include a rectifier circuit that rectifies an AC voltage of the grid 3, converts the AC voltage into the DC link voltage, and then outputs the DC link voltage. That is, the inverter 13 may be a bidirectional inverter whose input and output directions may be changed.

The inverter 13 may include a filter for removing a harmonic from the AC voltage output from the grid 3. Also, the inverter 13 may include a phase locked loop (PLL) circuit for synchronizing a phase of an AC voltage output from the inverter 13 with a phase of the AC voltage output from the grid 3 so as to prevent occurrence of reactive power. In addition, the inverter 13 may perform functions including restriction of a voltage variation range, improvement of a power factor, removal of a DC component, transient phenomenon protection, and the like. When the inverter 13 is not used, an operation of the inverter 13 may be stopped to reduce power consumption.

The converter 14 is a power converting device connected between the DC link unit 12 and the battery pack 20. In a discharge mode, the converter 14 may include a converter that DC-DC converts a voltage of power stored in the battery pack 20 into the DC link voltage, i.e., a voltage level required by the inverter 13. Also, in a charge mode, the converter 14 may include a converter that DC-DC converts a voltage of power output from the power converting unit 11 or the inverter 13 into a charge voltage, i.e., a voltage level required by the battery pack 20. That is, the converter 14 may be a bidirectional converter whose input and output directions may be changed. When it is not necessary to charge or discharge the battery pack 20, an operation of the converter 14 may be stopped to reduce power consumption.

The integrated controller 15 monitors the statuses of the power generating system 2, the grid 3, the battery pack 20, and the load 4, and controls operations of the power converting unit 11, the inverter 13, the converter 14, the battery pack 20, the first switch 30, and the second switch 40 according to a result of the monitoring. The integrated controller 15 may monitor whether a power failure occurs in the grid 3, whether power may be generated by the power generating system 2, the amount of power generation if the power generating system 2 generates power, a charge status of the battery pack 20, power consumption of the load 4, a time, or the like. Also, in a case where power to be supplied to the load 4 is not sufficient due to the power failure in the grid 3 or the like, the integrated controller 15 may decide a priority order with respect to power consuming devices included in the load 4 and then may control the load 4 to supply power to a power consuming device having higher priority.

The first switch 30 and the second switch 40 are serially connected between the inverter 13 and the grid 3, and perform on/off operations according to a control by the integrated controller 15, so that the first switch 30 and the second switch 40 control a flow of a current between the power generating system 2 and the grid 3. The first switch 30 and the second switch 40 may be turned on or off according to the status of the power generating system 2, the grid 3, and the battery pack 20.

In more detail, when power from the power generating system 2 and/or the battery pack 20 is supplied to the load 4, or when power from the grid 3 is supplied to the battery pack 20, the first switch 30 is turned on. When power from the power generating system 2 and/or the battery pack 20 is supplied to the grid 3, or when power from the grid 3 is supplied to the load 4 and/or the battery pack 20, the second switch 40 is turned on.

When the power failure occurs in the grid 3, the second switch 40 may be turned off and the first switch 30 may be turned on. That is, the power from the power generating system 2 and/or the grid 3 may be supplied to the load 4, and simultaneously, it is possible to prevent the power, which is to be supplied to the load 4, from flowing to the grid 3. In this manner, by preventing the operation of the energy storage system 1, it is possible to prevent a worker who is working with a power line of the grid 3 from being injured by the power from the energy storage system 1.

A switching device may include a relay or the like capable of enduring a large current may be used as the first switch 30 and the second switch 40.

The battery pack 20 may receive and store power from the power generating system 2 and/or the grid 3, and supply stored power to the load 4 or the grid 3. The battery pack 20 may include a part for storing power, and a controlling unit. Hereinafter, the battery pack 20 will now be described in detail with reference to FIG. 2.

Figure 2:
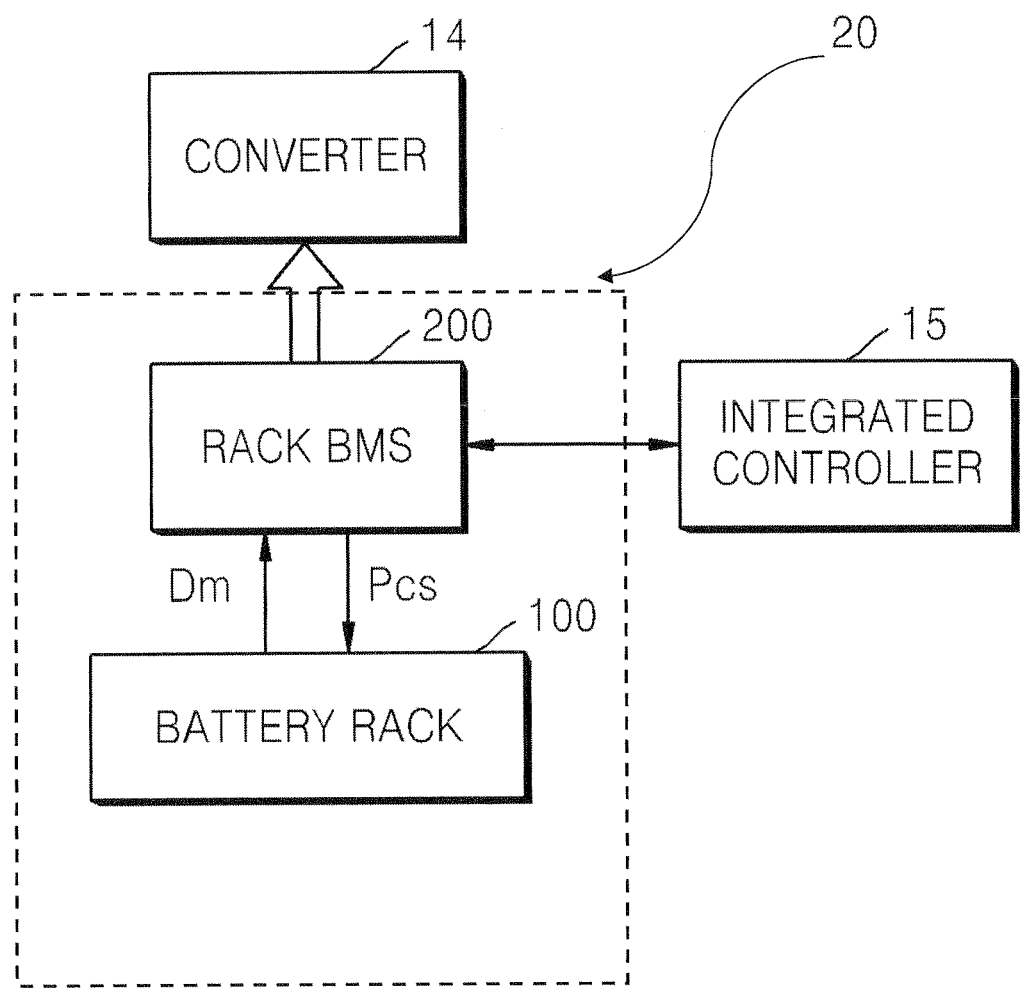
FIG. 2 is a diagram illustrating a configuration of a battery pack, according to an embodiment of the present invention.

FIG. 2 is a diagram illustrating a configuration of the battery pack 20, according to an embodiment of the present invention.

Referring to FIG. 2, the battery pack 20 may include a battery rack 100 and a rack battery management system (BMS) 200.

The battery rack 100 stores power supplied from an external source, that is, the power generating system 2 and/or the grid 3, and supplies stored power to the power generating system 2 and/or the grid 3. The battery rack 100 may include a plurality of sub-units which will be described in detail with reference to FIG. 3.

Figure 3:
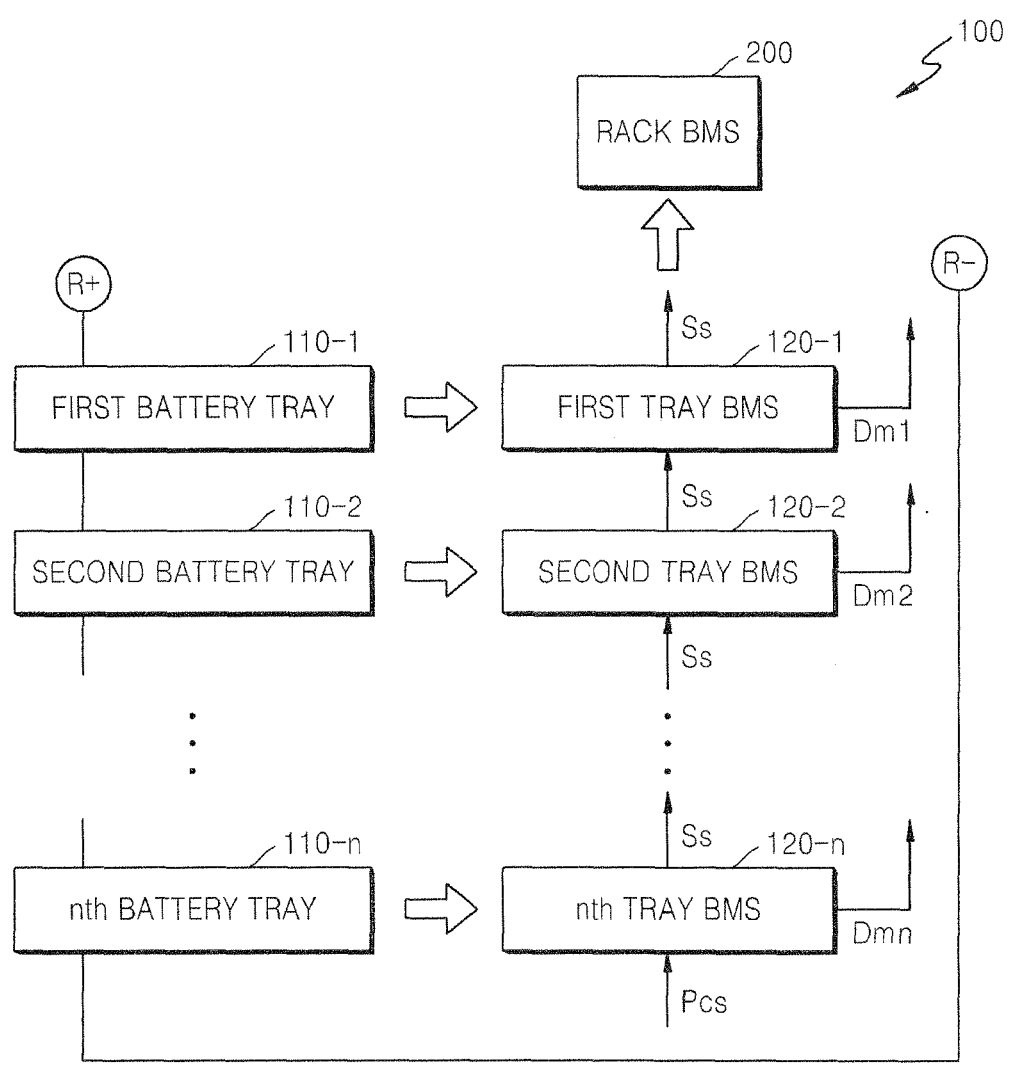
FIG. 3 is a diagram illustrating a configuration of a battery rack, according to an embodiment of the present invention.

FIG. 3 is a diagram illustrating a configuration of the battery rack 100, according to an embodiment of the present invention.

Referring to FIG. 3, the battery rack 100 may include a first battery tray 110-1 through an $n_{th}$ battery tray 110-$n$ that are sub-units connected in series and/or in parallel. Each of the first battery tray 110-1 through the $n_{th}$ battery tray 110-$n$ may include a plurality of battery cells as sub-units. One of various chargeable secondary batteries may be used as the battery cell. For example, the various secondary batteries to be used as the battery cell include nickel-cadmium battery, a lead battery, a nickel metal hydrate (NiMH) battery, a lithium ion battery, a lithium polymer battery, or the like.

The battery rack 100 may be adjusted to output desired power according to connection between the first battery tray 110-1 through the $n_{th}$ battery tray 110-$n$, and may output power by using a positive output terminal R+ and a negative output terminal R−.

Also, the battery rack 100 may include a plurality of first BMSs. The plurality of first BMSs may comprise a first tray BMS 120-1 through an $n_{th}$ tray BMS 120-$n$ that correspond to the first battery tray 110-1 through the $n_{th}$ battery tray 110-$n$, respectively. The first tray BMS 120-1 through the $n_{th}$ tray BMS 120-$n$ may be triggered in response to a power control signal PCS that is input from a second BMS, e.g. the rack BMS 200. According to the present embodiment, a synchronization signal Ss that is generated in response to the power control signal PCS may be delivered to the first tray BMS 120-1 through the $n_{th}$ tray BMS 120-$n$ in a cascade manner, so that the first tray BMS 120-1 through the $n_{th}$ tray BMS 120-$n$ are activated and thus operate.

According to one or more embodiments of the present invention, in a power saving mode, while the rack BMS 200 operates, the first tray BMS 120-1 through the $n_{th}$ tray BMS 120-$n$ may be deactivated in response to the power control signal PCS that is applied to the rack BMS 200, so that power consumption by the battery pack 20 is significantly decreased. In the battery pack 20, the first tray BMS 120-1 through the $n_{th}$ tray BMS 120-$n$ require high power consumption due to a large number of the first tray BMS 120-1 through the $n_{th}$ tray BMS 120-$n$, so that power consumption may be significantly decreased by deactivating the first tray BMS 120-1 through the $n_{th}$ tray BMS 120-$n$.

Also, only the first tray BMS 120-1 through the $n_{th}$ tray BMS 120-n are deactivated while the rack BMS 200 is activated, so that it is possible to significantly decrease power consumption of the battery pack 20 while a basic function of the battery pack 20 is maintained. For example, in the power saving mode, the battery pack 20 deactivates the first tray BMS 120-1 through the $n_{th}$ tray BMS 120-n while the battery pack 20 performs a signal exchange between the rack BMS 200 and the integrated controller 15, and the battery pack 20 activates the first tray BMS 120-1 through the $n_{th}$ tray BMS 120-n only when their operation is necessary. By doing so, power consumption by the battery pack 20 may be significantly decreased.

The first tray BMS 120-1 through the $n_{th}$ tray BMS 120-n monitor a voltage, a current, a temperature, or the like of the first battery tray 110-1 through the $n_{th}$ battery tray 110-n, respectively. A result of the monitoring by the first tray BMS 120-1 through the $n_{th}$ tray BMS 120-n may be transmitted to the rack BMS 200.

Referring back to FIG. 2, the rack BMS 200 may be connected to the battery rack 100, and controls charging and discharging operations of the battery rack 100. Also, the rack BMS 200 may perform an over-charge protection function, an over-discharge protection function, an over-current protection function, an over-voltage protection function, an over-heat protection function, a cell balancing function, and the like. To do so, the rack BMS 200 transmits the power control signal PCS to the battery rack 100, and receives monitoring data Dm regarding a voltage, a current, the temperature, a remaining amount of power, the lifetime, a charge status, and the like from each of the first tray BMS 120-1 through the $n_{th}$ tray BMS 120-n of the battery rack 100. Also, the rack BMS 200 may apply the monitoring data Dm to the integrated controller 15, and may receive a command regarding a control of the battery rack 100 from the integrated controller 15.

Figure 4:
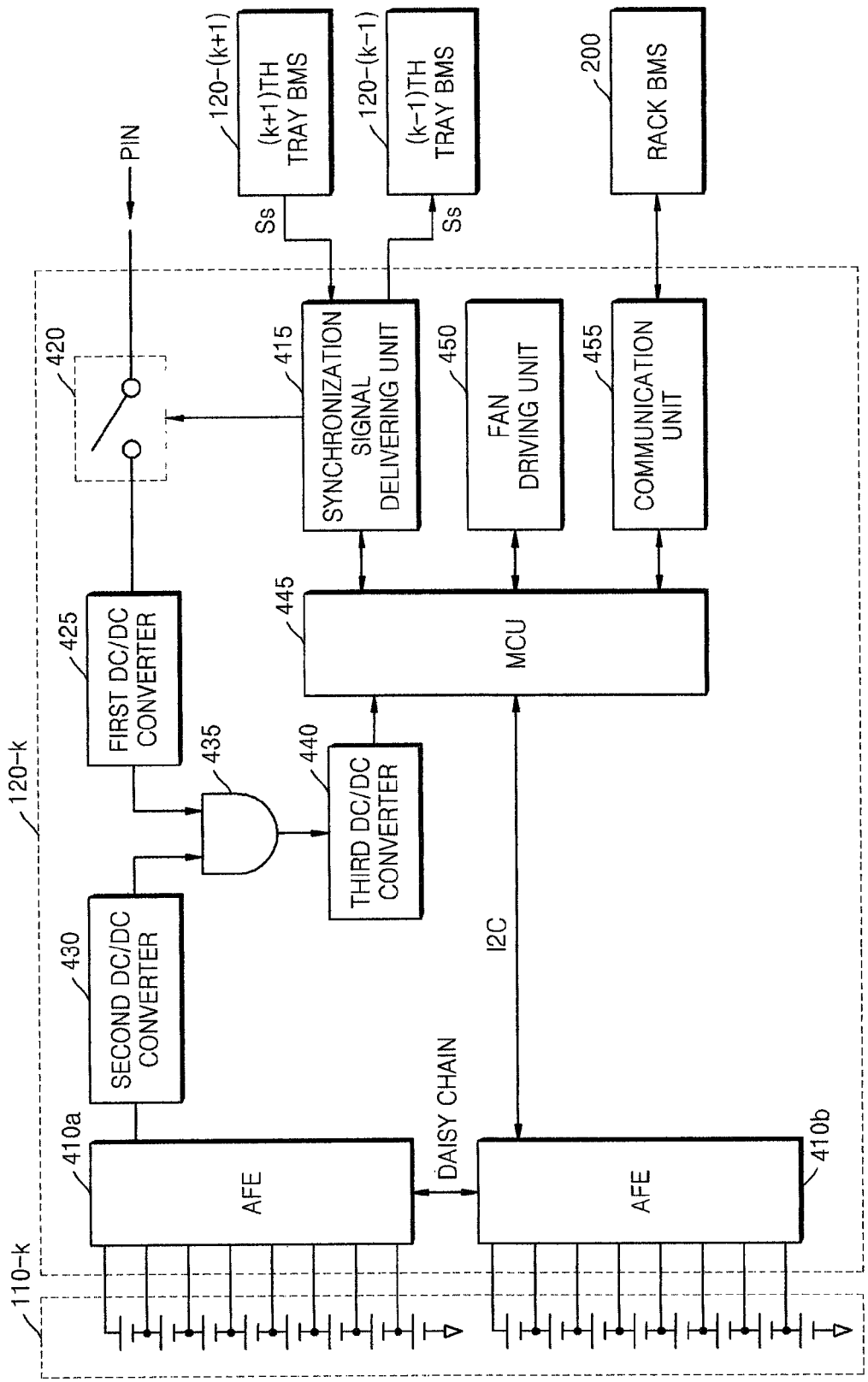
FIG. 4 is a diagram illustrating a structure of a $k_{th}$ battery tray and a $k_{th}$ tray battery management system (BMS), according to an embodiment of the present invention.

FIG. 4 is a diagram illustrating a structure of a $k_{th}$ battery tray 110-k and a $k_{th}$ tray BMS 120-k, according to an embodiment of the present invention. Here, k is an integer that is greater than 0 and equal to or less than n. According to the present embodiment, the $k_{th}$ battery tray 110-k indicates a structure of each of the first battery tray 110-1 through the $n_{th}$ battery tray 110-n, and the $k_{th}$ tray BMS 120-k indicates a structure of each of the first tray BMS 120-1 through the $n_{th}$ tray BMS 120-n.

The $k_{th}$ battery tray 110-k may include one or more battery cells that are serially connected to each other. As described above, the one or more battery cells may be embodied by using one of various chargeable secondary batteries.

The $k_{th}$ tray BMS 120-k may include one or more analog front end (AFE) 410a and 410b, a synchronization signal delivering unit 415, a tray ON/OFF unit 420, a first DC/DC converter 425, a second DC/DC converter 430, an MCU ON/OFF unit 435, a third DC/DC converter 440, an MCU 445, a fan driving unit 450, and a communication driving unit 455.

The synchronization signal delivering unit 415 may receive a synchronization signal Ss and then delivers it to the MCU 445 and the tray ON/OFF unit 420. According to the embodiment of FIG. 3 in which the synchronization signal Ss is delivered in a direction from the $n_{th}$ tray BMS 120-n to the first tray BMS 120-1, the synchronization signal Ss may be input from a $(k+1)_{th}$ tray BMS 120-(k+1) and may be delivered to a $(k-1)_{th}$ tray BMS 120-(k-1). In a case where the $k_{th}$ tray BMS 120-k is an $n_{th}$ tray BMS 120-k, the synchronization signal Ss that is delivered to the synchronization signal delivering unit 415 may be the power control signal PCS input from the rack BMS 200.

However, one or more embodiments of the present invention are not limited to a configuration in which the synchronization signal Ss is delivered in the direction from the $n_{th}$ tray BMS 120-n to the first tray BMS 120-1. Conversely, it is possible that the synchronization signal Ss is delivered in an opposite direction from the first tray BMS 120-1 to the $n_{th}$ tray BMS 120-n. In this case, the power control signal PCS may be input to the synchronization signal delivering unit 415 of the first tray BMS 120-1.

The tray ON/OFF unit 420 may receive driving power PIN. If the synchronization signal Ss has a first level, the tray ON/OFF unit 420 delivers the driving power PIN to the first DC/DC converter 425, and if the synchronization signal Ss has a second level, the tray ON/OFF unit 420 does not deliver the driving power PIN to the first DC/DC converter 425. According to whether the tray ON/OFF unit 420 delivers the driving power PIN, whether the $k_{th}$ tray BMS 120-k operates is decided. According to this configuration, the rack BMS 200 may control whether to operate the first tray BMS 120-1 through the $n_{th}$ tray BMS 120-n. The tray ON/OFF unit 420 may be embodied by using a switching device such as a field effect transistor (FET) or the like.

The first DC/DC converter 425 receives the driving power PIN delivered via the tray ON/OFF unit 420, and then firstly adjusts a voltage level of the driving power PIN. Power output from the first DC/DC converter 425 may be input to the MCU ON/OFF unit 435.

The AFE 410a and 410b monitors a voltage, a current, the temperature, a remaining amount of power, the lifetime, a charge status, and the like of the $k_{th}$ battery tray 110-k. Also, the AFE 410a and 410b performs AC-DC conversion on measured monitoring data and then delivers the measured monitoring data to the MCU 445. According to the present embodiment, as illustrated in FIG. 4, the AFE 410a and 410b may be serially connected to each other. In another embodiment, the AFE 410a and 410b may be formed as one integrated chip (IC).

The monitoring data measured by the AFE 410a and 410b may be delivered to the MCU 445. A data transmission from the AFE 410a and 410b may be performed according to an I2C method.

Also, the AFE 410a and 410b may operate according to a control by the MCU 445. For example, the MCU 445 may control the AFE 410a and 410b to generate monitoring data by monitoring the $k_{th}$ battery tray 110-k or may control the AFE 410a and 410b to perform a cell balancing operation, an over-current protection operation, an over-heat protection operation, or the like.

For an operation of the MCU 445, the AFE 410a and 410b delivers a current output from the $k_{th}$ battery tray 110-k to the second DC/DC converter 430. The second DC/DC converter 430 may perform DC/DC conversion on the current output from the AFE 410a and 410b and then may output the current to the MCU 445.

Only when the MCU ON/OFF unit 435 receives power, which is equal to or greater than a predetermined voltage level, from both the first DC/DC converter 425 and the second DC/DC converter 430, does the MCU ON/OFF unit 435 input power received from first DC/DC converter 425 and/or the second DC/DC converter 430 to the third DC/DC converter 440. The MCU ON/OFF unit 435 may be formed as an AND gate logic circuit.

If the power is received from the MCU ON/OFF unit 435, the third DC/DC converter 440 performs DC/DC conversion on the power according to a level satisfying an operation specification, and then outputs the power to the MCU 445.

The MCU ON/OFF unit 435 inputs the power to the MCU 445 only when the power having a predetermined level is received from the first DC/DC converter 425, and the first DC/DC converter 425 receives the driving power PIN only when the synchronization signal Ss has a first level, so that whether the MCU 445 operates is decided according to a control by the power control signal PCS input from the rack BMS 200.

The MCU 445 controls operations of the $k_{th}$ battery tray 110-$k$ and the $k_{th}$ tray BMS 120-$k$. The MCU 445 controls operations of the AFE 410$a$ and 410$b$, and collects the monitoring data from the AFE 410$a$ and 410$b$. Also, the MCU 445 controls operations of the fan driving unit 450 and the communication driving unit 455.

The MCU 445 may exchange a control signal and monitoring data Dmk with the rack BMS 200 via the communication driving unit 455. For example, the communication driving unit 455 may perform communication between the rack BMS 200 and the MCU 445 by using a controller area network (CAN) communication method.

The fan driving unit 450 drives a fan so as to cool the rack BMS 200. The fan driving unit 450 may control a speed of the fan by using the control signal and/or data received from the MCU 445. For example, the fan driving unit 450 may adjust the speed of the fan according to a temperature of the kth battery tray 110-$k$.

Figure 5:
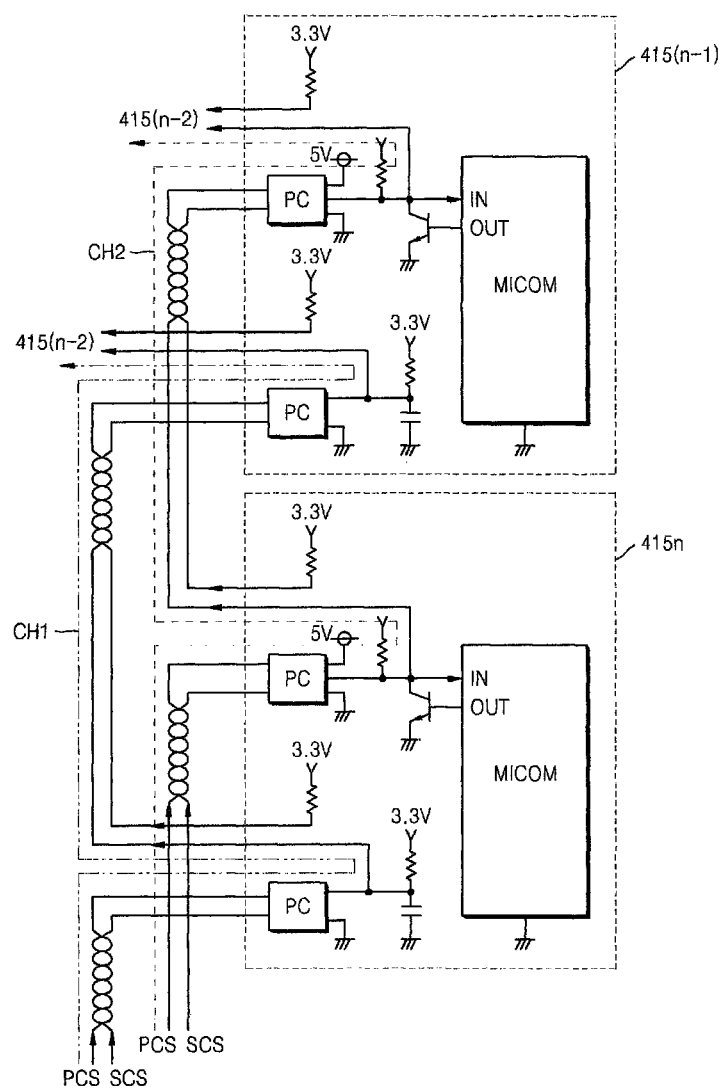
FIG. 5 is a diagram for describing a delivery of a synchronization signal, according to an embodiment of the present invention.

FIG. 5 is a diagram for describing a delivery of the synchronization signal Ss, according to an embodiment of the present invention. FIG. 5 illustrates a synchronization signal delivering unit of the $n_{th}$ tray BMS 120-$n$ (hereinafter, referred to as '$n_{th}$ synchronization signal delivering unit 415$n$'), and a synchronization signal delivering unit of an (n−1)$_{th}$ tray BMS 120-($n$−1) (hereinafter, referred to as '(n−1)$_{th}$ synchronization signal delivering unit 415($n$−1)').

According to the present embodiment, a first synchronization signal Ss1 may be delivered via a first chain CH1, and a second synchronization signal Ss2 may be delivered via a second chain CH2. The second synchronization signal Ss2 may be input to a microcomputer (MICOM) arranged in each of the $n_{th}$ synchronization signal delivering unit 415$n$ and the (n−1)$_{th}$ synchronization signal delivering unit 415($n$−1). The MICOM may store statuses of the $n_{th}$ synchronization signal delivering unit 415$n$ and the (n−1)$_{th}$ synchronization signal delivering unit 415($n$−1), and may control the $n_{th}$ synchronization signal delivering unit 415$n$ and the (n−1)$_{th}$ synchronization signal delivering unit 415($n$−1).

Photo-couplers (PC) may be arranged in the first chain CH1 and the second chain CH2 so as to function as an insulating switch when the first synchronization signal Ss1 and the second synchronization signal Ss2 are delivered.

The delivery of the first and second synchronization signals Ss1 and Ss2 via the first chain CH1 and the second chain CH2 may be triggered in response to the power control signal PCS and a sampling control signal (SCS).

Figure 6:
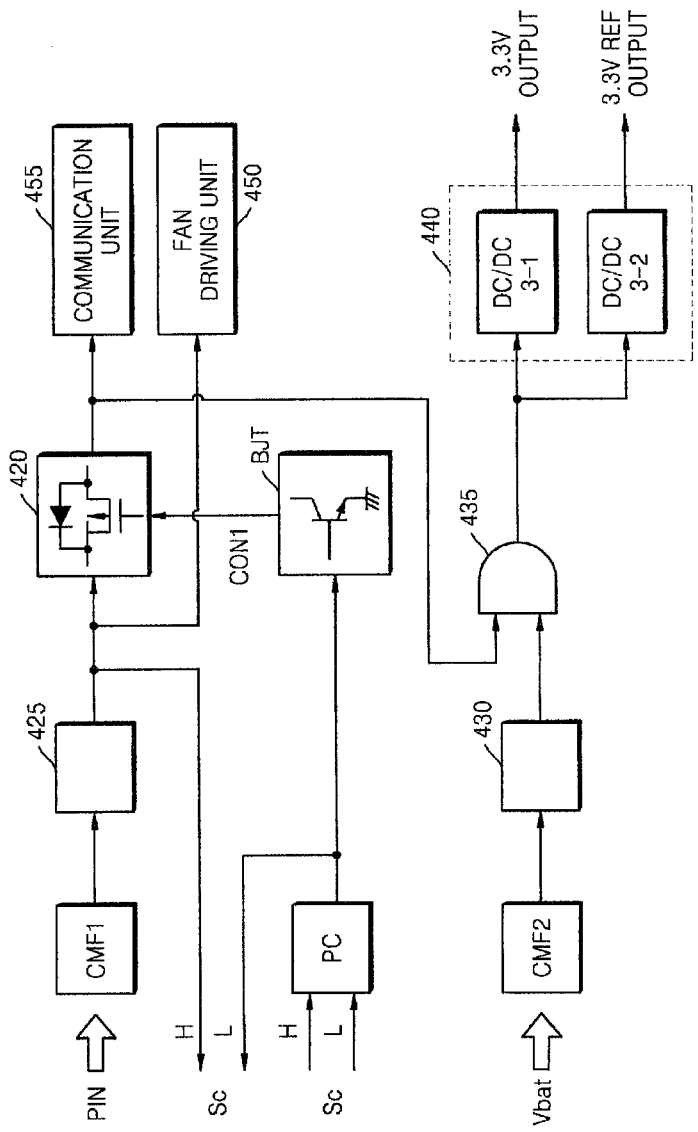
FIG. 6 is a diagram for describing an ON/OFF control of the kth tray BMS, according to an embodiment of the present invention.

FIG. 6 is a diagram for describing an ON/OFF control of the $k_{th}$ tray BMS 120-$k$, according to an embodiment of the present invention.

The $k_{th}$ tray BMS 120-$k$ receives driving power PIN, allows the driving power PIN to pass a first noise removal filter CMF1, converts the driving power PIN into a predetermined voltage level by using the first DC/DC converter 425, and inputs the driving power PIN to the tray ON/OFF unit 420.

Also, a synchronization signal Ss that is received from the (k+1)$_{th}$ tray BMS 120-($k$+1) or the (k−1)$_{th}$ tray BMS 120-($k$−1) is input to a control terminal of a first switch BJT via a photo-coupler PC, and the first switch BJT generates and inputs a first control signal to the tray ON/OFF unit 420. The first switch BJT may be a bipolar junction transistor. In this case, the synchronization signal Ss that is input to the $k_{th}$ tray BMS 120-$k$ is input to a base terminal of the bipolar junction transistor. Also, in a case where the synchronization signal Ss that is input to the $k_{th}$ tray BMS 120-$k$ has a turn-on level with respect to the bipolar junction transistor, a first control signal CON1 having a first level to turn on the tray ON/OFF unit 420 is output via a collector of the bipolar junction transistor.

If the first control signal CON1 has the first level, the tray ON/OFF unit 420 delivers power, which may be received from the first DC/DC converter 425, to the communication driving unit 455 and the MCU ON/OFF unit 435. If the first control signal CON1 has a second level to turn off the tray ON/OFF unit 420, power is not input to the communication driving unit 455 and the MCU ON/OFF unit 435, so that the communication driving unit 455 and the MCU 445 may be deactivated.

The power that is output from the first DC/DC converter 425 is also output to the fan driving unit 450.

Also, the synchronization signal Ss that is input to the $k_{th}$ tray BMS 120-$k$ is delivered to the (k+1)$_{th}$ tray BMS 120-($k$+1) or the (k−1)$_{th}$ tray BMS 120-($k$−1) via the photo-coupler PC.

A battery voltage Vbat is input from the $k_{th}$ battery tray 110-$k$ to the $k_{th}$ tray BMS 120-$k$. The battery voltage Vbat is filtered by a second noise removal filter CMF2 and then is input to the MCU ON/OFF unit 435. In a case where the tray ON/OFF unit 420 is turned on so that power is output from the first DC/DC converter 425, the MCU ON/OFF unit 435 inputs the power to the third DC/DC converter 440. The third DC/DC converter 440 may include a 3-1$_{th}$ DC/DC converter DC/DC 3-1 for generating an MCU driving voltage, and a 3-2$_{th}$ DC/DC converter DC/DC 3-2 for generating a reference voltage. The MCU driving voltage and the reference voltage generated by the third DC/DC converter 440 are supplied to the MCU 445.

According to the aforementioned configuration, the operations of the communication driving unit 455 and the MCU 445 may be controlled by a control in response to the power control signal PCS that is received from the rack BMS 200, so that power consumption by the first tray BMS 120-1 through the $n_{th}$ tray BMS 120-$n$ may be significantly decreased.

While this invention has been particularly shown and described with reference to exemplary embodiments thereof, it will be understood by those of ordinary skill in the art that various changes in form and details may be made therein without departing from the spirit and scope of the invention as defined by the appended claims. For example, the one or more embodiments of the present invention are described with reference to a case in which the battery pack 20 is used in the energy storage system 1 but the present invention is not limited to the embodiments and thus include various embodiments in which the battery pack 20 is used other various devices. Therefore, the scope of the invention is defined not by the detailed description of the invention but by the appended claims, and all differences within the scope will be construed as being included in the present invention.

What is claimed is:

1. An Energy Storage System, comprising:
   a plurality of trays with each tray having a plurality of battery cells;
   a plurality of first BMSs (Battery Management System) with each first BMS being electrically coupled to a corresponding tray of the plurality of trays;
   a rack comprising the plurality of trays; and
   a second BMS (Battery Management System) electrically coupled to and controlling the plurality of first BMSs;

wherein each of the plurality of first BMSs comprises:
- a controller electrically coupled to and controlling the plurality of battery cells of the corresponding tray; and
- a switch unit electrically coupled to the controller and selectively applying a driving power to the controller according to a control signal from the second BMS, and wherein in a power saving mode, while the second BMS remains activated, the plurality of first BMSs are deactivated in response to the control signal from the second BMS.

2. The Energy Storage System recited in claim 1, wherein each of the plurality of first BMSs, further comprises:
- a first converter converting the driving power and outputting a first converting signal;
- a second converter converting a battery power and outputting a second converting signal; and
- a controller ON/OFF unit electrically coupled to the first converter and the second converter and sending a driving signal to the controller when both the first converting signal and the second converting signal are more than a predetermined signal level.

3. The Energy Storage System recited in claim 1, wherein each of the plurality of first BMSs, further comprises:
- a synchronization signal delivering unit receiving a synchronization signal from a neighboring one of the plurality of first BMSs and delivering the synchronization signal to a neighboring another of the plurality of first BMSs, wherein the synchronization signal is transmitted from the second BMS as the control signal to one of the plurality of first BMSs, and transmitted from said one of the first BMSs of the plurality of first BMSs to another first BMS of the plurality of first BMSs in a cascade manner;
- a tray ON/OFF unit connected to the synchronization signal delivering unit and selectively delivering the driving power according to the synchronization signal;
- a first DC/DC converter connected to the tray ON/OFF unit and converting the driving power to a first converting signal;
- a second DC/DC converter connected to an analog front end (AFE) and converting a battery power to a second converting signal;
- a microcontroller (MCU) ON/OFF unit connected to the first and second DC/DC converter and outputting a driving signal when both the first converting signal and the second converting signal are more than a predetermined signal level;
- a third DC/DC converter connected to the microcontroller (MCU) ON/OFF unit and converting the driving signal from the MCU ON/OFF unit to a MCU driving power and outputting the MCU driving power;
- a MCU connected to the synchronization signal delivering unit and the third DC/DC converter and receiving the MCU driving power from the third DC/DC converter; and
- a communication unit connected to the MCU and the second BMS.

4. The Energy Storage System recited in claim 3, wherein the microcontroller (MCU) ON/OFF unit comprises an AND gate electrically coupled to the first DC/DC converter and the second DC/DC converter and sending the driving signal to the third DC/DC converter when both the first converting signal and the second converting signal have a predetermined signal logic level.

5. The Energy Storage System recited in claim 4, the plurality of battery cells receive power from a power generating system or supply power to a grid or to a load.

6. The Energy Storage System recited in claim 5, further comprising:
- a power conversion system connected to the plurality of battery cells and the power generating system to convert power from the power generating system, the grid or the plurality of battery cells and supply the power to the load;
- a first switch connected to the power conversion system and connected to the load; and
- a second switch serially connected to the first switch and connected to the power conversion system, the grid and the load, wherein the first switch is turned on when power from the power generating system and/or the plurality of battery cells is supplied to the load, or when power from the grid is supplied to the battery pack, wherein the second switch is turn on when power from the power generating system and/or the plurality of battery cells is supplied to the grid, or when power from the grid is supplied to the load and/or the plurality of battery cells, and wherein the second switch is turned off and the first switch is turned on when a power failure occurs in the grid.

7. The Energy Storage System recited in claim 3, wherein when the synchronization signal is set to a first level, the tray ON/OFF unit delivers the driving power to the first DC/DC converter, and when the synchronization signal is set to a second level that is different from the first level, the tray ON/OFF unit does not deliver the driving power to the first DC/DC converter.

8. The Energy Storage System recited in claim 7, wherein the second BMS determines whether to activate the plurality of first BMSs based on an operating mode.

9. The Energy Storage System recited in claim 8, wherein the first DC/DC converter receives the driving power delivered via the tray ON/OFF unit and adjusts a voltage level of the driving power and inputs the driving power to the MCU ON/OFF unit.

10. The Energy Storage System recited in claim 9, wherein the AFE monitors voltage, current, and temperature of the at least one tray of the plurality of trays and transmits monitoring data to the MCU.

11. The Energy Storage System recited in claim 10, wherein the AFE delivers a current output from the at least one tray of the plurality of trays to the second DC/DC converter, and upon receipt of the current output from the second DC/DC converter, the MCU ON/OFF unit outputs the current to the MCU.

12. The Energy Storage System recited in claim 11, wherein only when the MCU ON/OFF unit receives power from both the first DC/DC converter and the second DC/DC converter, the MCU ON/OFF unit inputs power received from first DC/DC converter or the second DC/DC converter to the third DC/DC converter.

13. A Battery System, comprising:
- a battery rack to store power from at least one of a power generating units or a grid, the battery rack comprising:
- a first battery tray through an nth battery tray connected in series or in parallel; and
- a plurality of first BMSs (Battery Management System) connected to corresponding tray among the first battery tray through the nth battery tray, respectively; and a second BMS (Battery Management System) to control an operation of the battery rack by monitoring data of the battery rack and transmitting a power control signal, wherein the first BMSs are triggered in response to the power control signal from the second BMS, wherein each first BMS comprises:
- a controller electrically coupled to and controlling the corresponding tray; and
- a switch unit electrically coupled to the controller and selectively applying a driving power to the controller according to the power control signal from the second BMS, and wherein in a power saving mode, while the second BMS remains activated, the plurality of first BMSs are deactivated in response to the power control signal from the second BMS.

14. The Battery System recited in claim 13, wherein each of the plurality of first BMSs comprises:
- a first converter converting the driving power and outputting a first converting signal;
- a second converter converting a battery power and outputting a second converting signal; and
- a controller ON/OFF unit electrically coupled to the first converter and the second converter and sending a driving signal to the controller when both the first converting signal and the second converting signal are more than a predetermined signal level.

15. The Battery System recited in claim 13, wherein each the plurality of first BMSs comprises:
- a synchronization signal delivering unit receiving a synchronization signal from a neighboring one of the plurality of first BMSs and delivering the synchronization signal to a neighboring another of the plurality of first BMSs, wherein the synchronization signal is transmitted from the second BMS as the power control signal to one of the plurality of first BMSs, and transmitted from said one of the first BMSs of the plurality of first BMSs to another first BMS of the plurality of first BMSs in a cascade manner;
- a tray ON/OFF unit connected to the synchronization signal delivering unit and selectively delivering the driving power according to the synchronization signal;
- a first DC/DC converter connected to the tray ON/OFF unit and converting the driving power to a first converting signal;
- a second DC/DC converter connected to an analog front end (AFE) and converting a battery power to a second converting signal;
- a microcontroller (MCU) ON/OFF unit connected to the first and second DC/DC converter and outputting a driving signal when both the first converting signal and the second converting signal are more than a predetermined signal level;
- a third DC/DC converter connected to the microcontroller (MCU) ON/OFF unit and converting the driving signal to a MCU driving power;
- a MCU connected to the synchronization signal delivering unit and the third DC/DC converter and receiving the MCU driving power from the third DC/DC converter; and
- a communication unit connected to the MCU and the second BMS.

* * * * *